United States Patent
Makineni et al.

(10) Patent No.: US 7,035,891 B2
(45) Date of Patent: Apr. 25, 2006

(54) REDUCED-HARDWARE SOFT ERROR DETECTION

(75) Inventors: Sivakumar Makineni, Sunnyvale, CA (US); Gautam B. Doshi, Santa Clara, CA (US)

(73) Assignee: Intel Corporation, Santa Clara, CA (US)

( * ) Notice: Subject to any disclaimer, the term of this patent is extended or adjusted under 35 U.S.C. 154(b) by 677 days.

(21) Appl. No.: 10/228,432

(22) Filed: Aug. 27, 2002

(65) Prior Publication Data

US 2004/0044717 A1  Mar. 4, 2004

(51) Int. Cl.
*G06F 11/16* (2006.01)
(52) U.S. Cl. .................... 708/530; 708/534
(58) Field of Classification Search ......... 708/530–534
See application file for complete search history.

(56) References Cited

U.S. PATENT DOCUMENTS

| | | | | |
|---|---|---|---|---|
| 3,660,646 A | * | 5/1972 | Minero et al. | 708/533 |
| 5,018,093 A | * | 5/1991 | Shih | 708/533 |
| 5,450,340 A | * | 9/1995 | Nicolaidis | 708/531 |
| 5,506,800 A | * | 4/1996 | Dao-Trong | 708/531 |

OTHER PUBLICATIONS

Lammers, D., "Equipment refines soft-error detectin in chips," http://www.eetimes.com/story/OEG20020524S0073, 2 pages, May 24, 2002.

Messer, A., et al., "Susceptibility of Modern Systems and Software to Soft Errors," HP Laboratories Palo Alto, HPL-2001-43, 11 pages, Mar. 7, 2001.

Shivakumar, P., et al., "Modeling the Effect of Technology Trends on the Soft Error Rate of Combinational Logic," http://www.cs.utexas.edu/users/skeckler/pubs/dsn02.pdf, 10 pages.

Wilson, R., "At 90 nm, process issues push into design flows," Silicon Engineering, Electronic Engineering Times, Jul. 15, 2002.

* cited by examiner

*Primary Examiner*—D. H. Malzahn
(74) *Attorney, Agent, or Firm*—Shireen I. Bacon (57) ABSTRACT

A method and system are provided for performing soft error detection for integer addition and subtraction operations without the use of redundant logic. For integer addition and subtraction, compensate logic produces a compensate value utilizing arithmetic logic unit (ALU) result and operands. The compensate value is validated by the validate logic against a predetermined value to determine whether a soft error has occurred. Such compensate logic and validate logic operate on the integer operands and on the result produced by the ALU without redundant carry-propagate hardware.

32 Claims, 10 Drawing Sheets

REDUCED-HARDWARE SOFT ERROR DETECTION

BACKGROUND OF THE INVENTION

1. Technical Field

The present invention relates to systems for processing data and, more particularly, to systems for detecting soft errors during execution in a computing environment.

2. Background Art

Of increasing concern to processor designers is the phenomenon of soft errors. Soft errors are intermittent errors that occur during processor execution and are due to alpha particles or high-energy neutrons in the atmosphere striking an active area of silicon rather than to design defects or manufacturing defects. Soft errors, while leaving the physical circuit intact, alter the stored charge in memory cells and logic, producing incorrect behavior and results. Accordingly, soft errors, also called transient faults or single-event upsets (SEUs), result in an invalid state.

Two sources of soft errors are high-energy neutrons and alpha particles. High-energy neutrons are the result of collision between cosmic rays and atmospheric particles. Alpha particles originate from radioactive decay of chip materials (such as solder bumps) and packaging materials. Soft errors occur when a high-energy neutron or alpha particle strikes an active area of a silicon substrate, causing a release of charges (electron hole pairs) that alters the state of a transistor. Accordingly, an error occurs in the operation that was being performed when the transistor's state was altered. Importantly, such soft errors often go undetected and can cause dramatic errors.

The rate of occurrence of soft errors, also referred to as "soft error rate" (SER), is predicted to increase due to large-scale integration (such as "VLSI" or "ULSI") design trends as well as semiconductor manufacturing trends. Several trends driving microprocessor performance and design include the scaling of device feature sizes and increased pipeline depths. These trends have led to reduction in feature size and voltage levels of the transistors, as well as an increase in transistor density. A particle (such as high-energy neutron or alpha particle) that strikes a transistor in a logic circuit or memory can alter the value produced by the circuit or stored in the memory. Chances that such a particle will indeed cause a soft error increase as density level increases and voltage levels decrease. While soft error detection is already a significant concern in servers, workstations, and mission critical systems, it is predicted that soft error detection will become increasingly important in processor (including desktop computers) and networking component designs as silicon geometries shrink and as the charge necessary to alter the state of transistors continues to diminish.

Though the cause of soft errors is not easily preventable, inasmuch as the particles that cause soft errors are extremely difficult to block, many processors already incorporate mechanisms for detecting soft errors. Typically, however, these mechanisms are focused on protecting memory elements such as system memory and caches. These mechanisms include error-correcting codes (ECC) and parity techniques. In contrast, detection of soft errors in combinational logic elements typically involves, in most known systems, relatively expensive redundant-hardware schemes. A drawback to this approach is that it is often not cost-effective to provide full hardware redundancy to detect soft errors in combinational logic, due to the significant silicon cost of redundant hardware.

Embodiments of the reduced-hardware soft error detection apparatus and method disclosed herein address these and other problems related to soft errors.

BRIEF DESCRIPTION OF THE DRAWINGS

The present invention may be understood with reference to the following drawings in which like elements are indicated by like numbers. These drawings are provided to illustrate selected embodiments of a reduced-hardware soft error detection apparatus and method and are not intended to be limiting.

DETAILED DISCUSSION OF THE INVENTION

The following discussion sets forth numerous specific details to provide a thorough understanding of the invention. However, those of ordinary skill in the art, having the benefit of this disclosure, will appreciate that the invention may be practiced without these specific details. In addition, various well-known methods, procedures, components, and circuits have not been described in detail in order to focus attention on the features of the present invention.

The reduced-hardware soft error detection embodiments discussed herein may be used for both signed and unsigned integer representations. While much of the discussion below focuses, for purposes of example, on signed integers, one skilled in the art will recognize that either signed or unsigned integer representations may used in conjunction with the soft error detection embodiments described herein.

Regarding signed integers, processor architectures typically specify a format for storing signed integers. A commonly-used format for representing signed integers is the two's complement format. The two's complement representation allows the use of binary arithmetic operations on signed integers, yielding the correct two's complement results. Positive two's complement integers are represented as the simple binary representation of the integer. Negative two's complement integers are represented as the binary number that, when added to a positive number of the same magnitude, equals zero.

A typical ALU in a processor handles addition and subtraction operations for signed and unsigned integers, and also handles certain logical operations. As used herein, the terms "arithmetic logic unit" and "ALU" are meant to include any logic element that is capable of performing integer arithmetic operations, including signed and unsigned addition and subtraction. One skilled in the art will recognize that the typical ALU hardware that performs logic operations, such as OR, AND, etc., may be duplicated without significant silicon cost. In contrast, the hardware that performs arithmetic operations, such as addition and subtraction of integers (typically a carry-propagate adder referred to as a "CPA"), involves significant silicon and execution costs.

The embodiments disclosed below provide soft error detection that does not require redundant hardware. Instead, compensation and validation logic determine, based on observed characteristics of integer addition and subtraction, whether an error has occurred.

Figure 1:
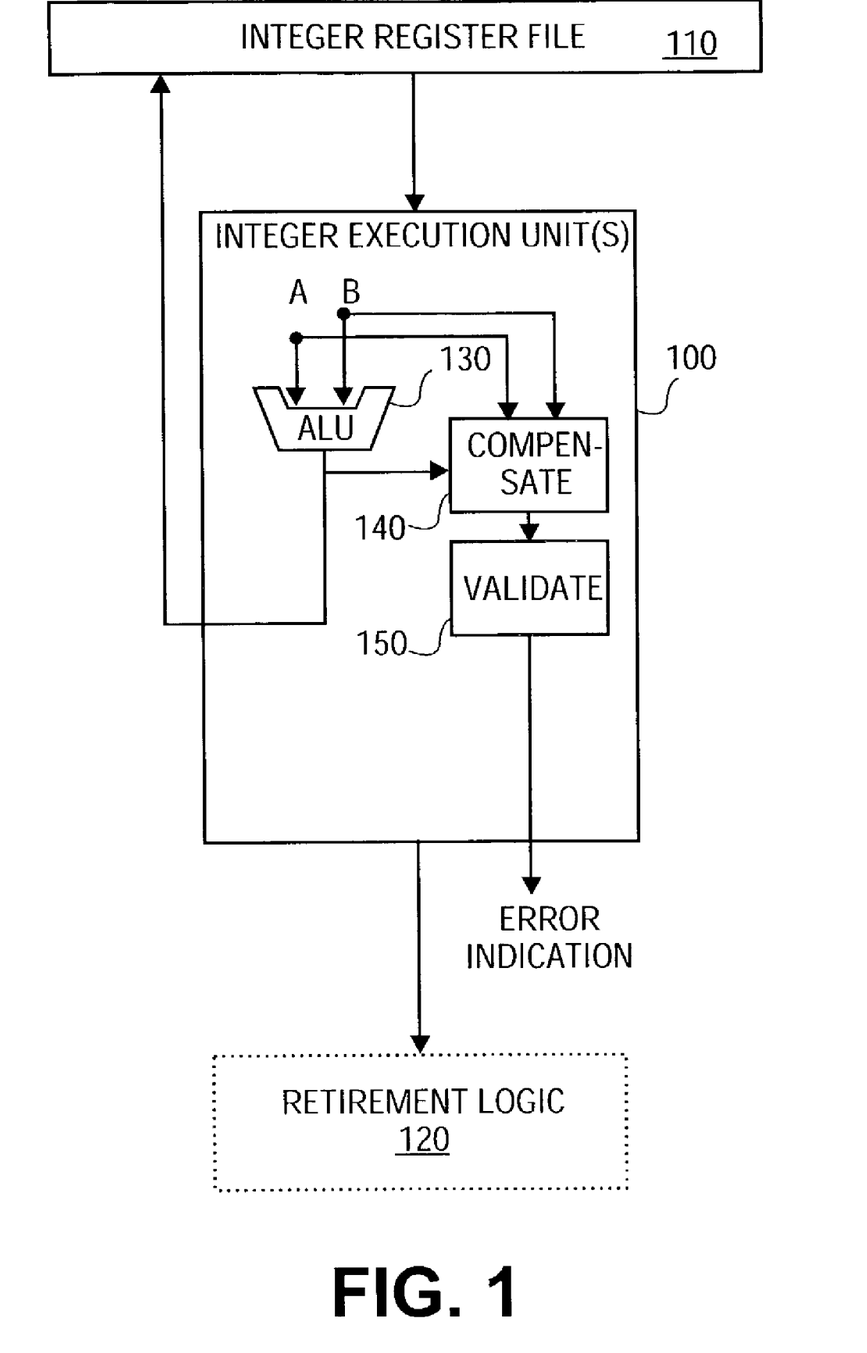
FIG. 1 is a block diagram of at least one embodiment of an integer-processing device capable of performing reduced-hardware soft error detection.

FIG. 1 is a block diagram of an integer-processing device 100 that is suitable for implementing reduced-hardware soft error detection as described herein. System 100 is suitable for implementation as an integer execution unit of a processor. System 100 includes an arithmetic logic unit 130, compensate logic 140 and validate logic 150. System 100 receives integer operands from an integer register file 110. The integer register file 110 stores the integer data operand values to be processed by the ALU 130 and the compensate logic 140. The integer data operand values may be represented, for at least one embodiment, as two's complement signed integers. For at least one alternative embodiment, the integer data operand values may be represented as unsigned integers.

Device 100 provides an error indication that may, for at least one embodiment, be provided to optional retirement logic 120. In an out-of-order processor, the retirement logic 120 receives the completion status of executed instructions from the execution units and processes the results so that the proper architectural state is committed (or retired) according to the program order. One skilled in the art will recognize that there are many manners of processing a soft error indication, including detection, reporting, and correction. Optional retirement logic 120 represents just one of many possible embodiments of such error processing.

Figure 2:
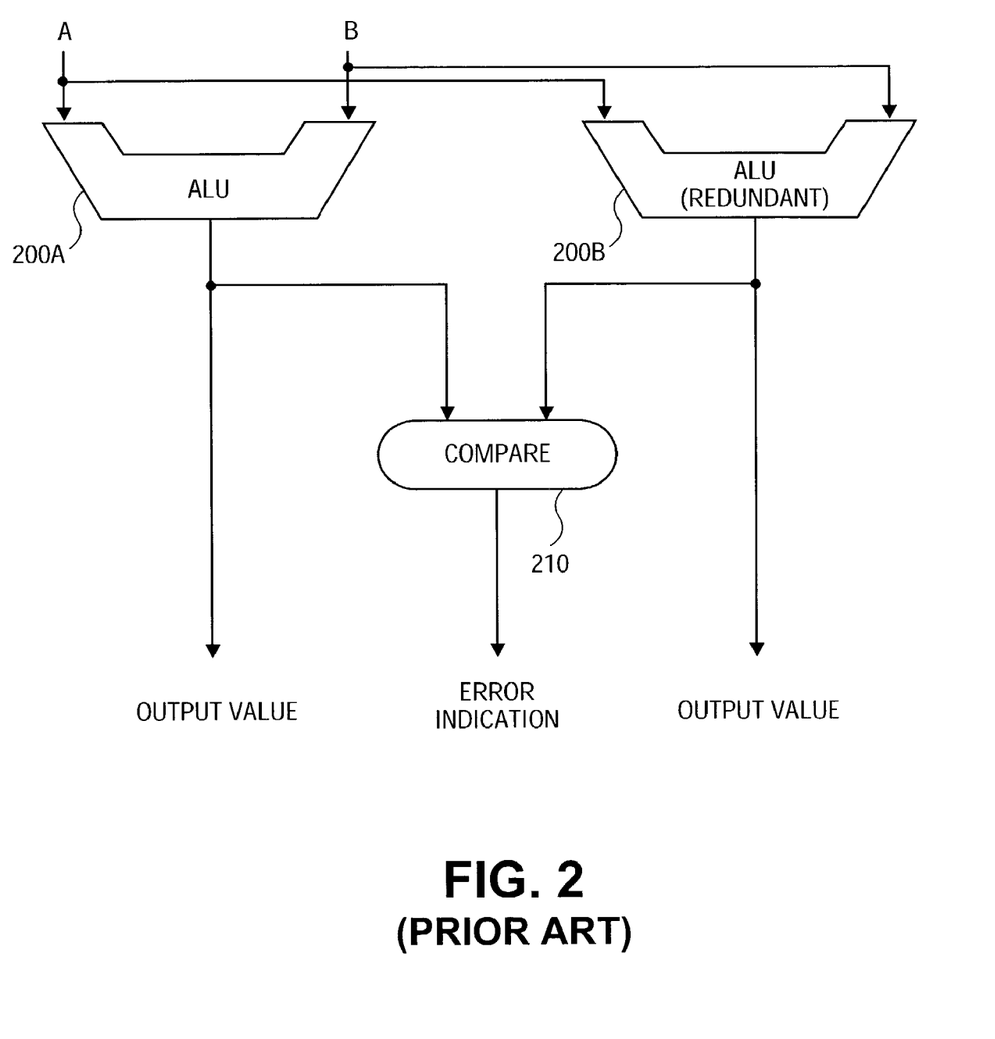
FIG. 2 is a block diagram of a prior art redundant-hardware soft error detection system.

FIG. 2 illustrates a prior art soft error detection scheme in which a primary ALU 200a and a redundant ALU 200b process the same inputs A and B. In other words, the ALU hardware is replicated. The output values generated by the primary and redundant ALUs 220a and 200b, respectively, are compared by compare hardware 210. If the two output values are not the same, then it is assumed that a soft error has occurred, and an error indication is generated. As such, the system illustrated in FIG. 2 is a "replicate" and "compare" system. As noted above, redundant ALU hardware as illustrated in FIG. 2 requires replication of relatively expensive carry-propagate adder hardware. In addition, the "replicate and compare" system requires compare hardware, which is often more costly, in terms of space and execution time, than the validate logic 150 (FIG. 1) discussed in further detail below. With the comparatively smaller hardware area associated with compensate and validate logic, discussed below in connection with FIGS. 3A through 9, there is less area of exposure, and hence, less chance of a soft error than in the relatively larger hardware of the replicate and compare system illustrated in FIG. 2.

The prior art scheme disclosed in FIG. 2 is based on the assumption that, due to their random nature, two soft errors, one in each of the redundant ALUs 220a, 220b, will not occur at the same time on the same logic gate or, if they did occur at the same time, that the impact of the error (in terms of the altered state) will not be the same. Without passing on whether such assumption is valid, it is noted that the prior art scheme illustrated in FIG. 2 suffers from a drawback inherent in redundancy. That is, any error in the hardware design of the first ALU 220a will be replicated in the second ALU 220b. It would be beneficial to implement a reduced-hardware soft error detection system that would also detect hardware design errors, rather than replicating them.

Figure 3A:
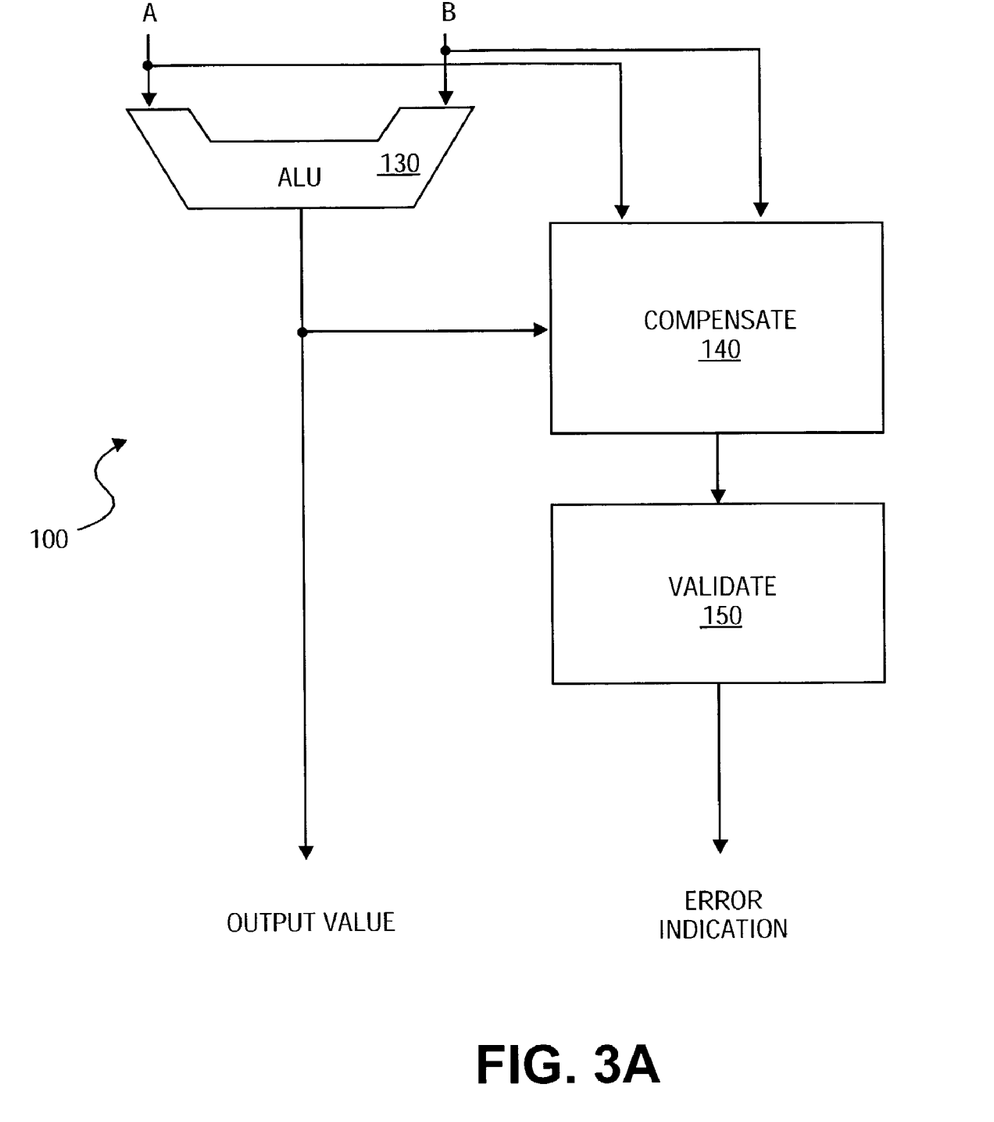
FIG. 3A is a data flow diagram illustrating the flow of data for at least one embodiment of a reduced-hardware soft error detection system.

FIG. 3A illustrates that, in contrast to a redundant-hardware system (see FIG. 2), at least one embodiment of integer-processing system 100 provides compensate logic 140 and validate logic 150 rather than the redundant ALU 200b and compare logic 210 illustrated in FIG. 2. Assuming that compensate logic 140 and validate logic 150 cumulatively contain less hardware than a second ALU and compare logic (such as 200b and 210, respectively, in FIG. 2), significant improvement in soft error detection costs is achieved. Other advantages of the system 100, in addition to costs savings, include the fact that non-redundant compensate and validate logic 140, 150 provide for detection of certain hardware design errors in ALU 130.

Figure 3B:
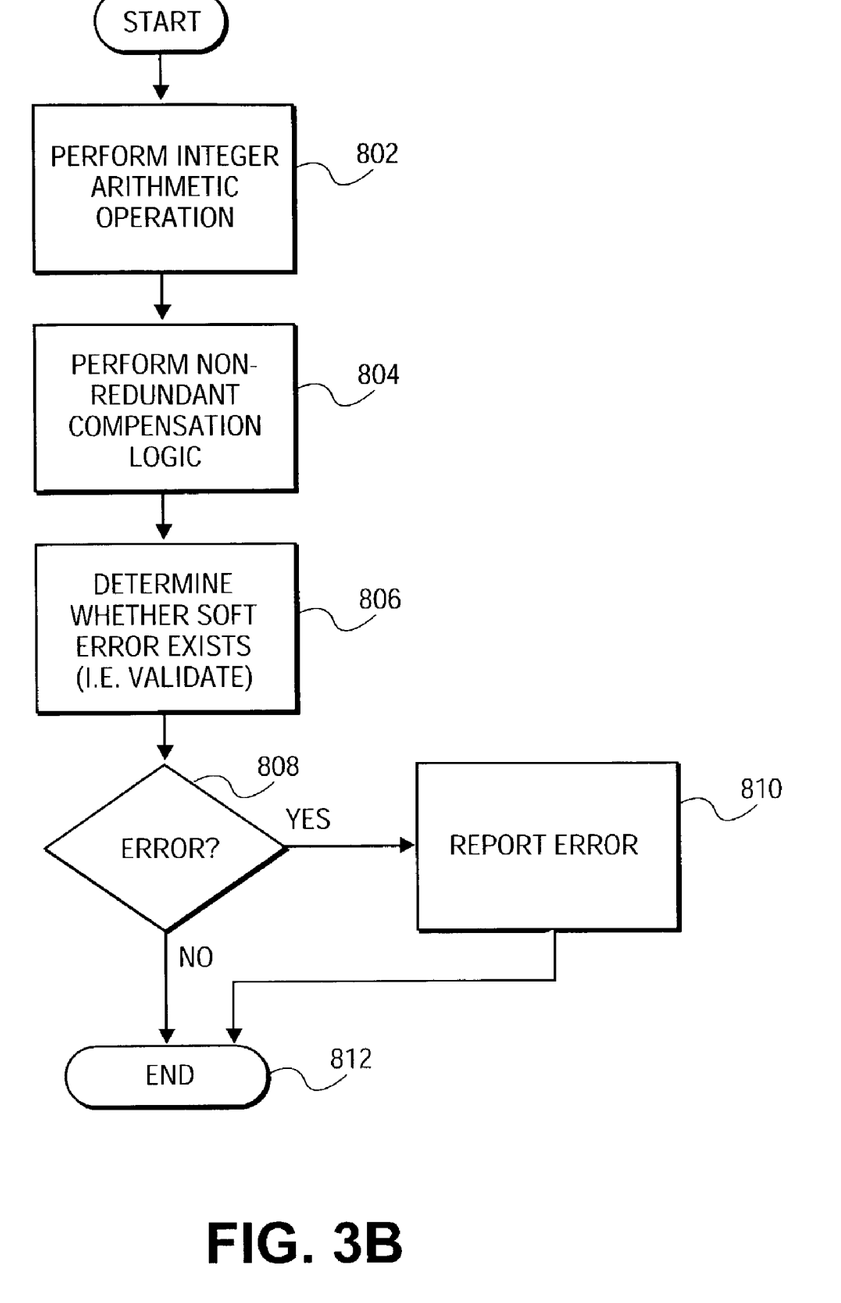
FIG. 3B is flowchart illustrating a method of performing reduced-hardware soft error detection.

FIG. 3B is a flowchart illustrating a method of performing soft error detection using the system 100 illustrated in FIG. 3A. Referring to FIGS. 3A and 3B, one can see that, in operation 802, the ALU 130 performs the requested integer arithmetic operation on operands A and B. An integer result is produced as a result of operation 802. In operation 804, non-redundant compensation logic 140 performs compensation on operands A and B and also on, for at least one embodiment, the result generated by the ALU 130 in operation 802. As a result of the compensation, a compensation result is produced. The compensation result includes, for at least one embodiment, a sum value and a carry value such as those produced by a carry save adder.

In operation 806, validation occurs. During the validation operation 806, validate logic 150 evaluates whether the result generated by the compensation logic 140 in operation 804 indicates that an error condition exists. For at least one embodiment, validate logic 150 compares the result generated by the compensate logic 140 in operation 804 with the predetermined value of −1. One skilled in the art will recognize that, based on the particular compensation logic 140 that is implemented, the predetermined value utilized in operation 804 may be a value other than −1. (See, e.g., the discussion of FIG. 9, below, where the predetermined value is −2).

Based on the result of the validation operation 806, it is determined in operation 808 whether a soft error exists. If so, the error is reported in operation 810. If not, processing ends at operation 812. One skilled in the art will recognize that many variants of the method described above may be practiced without departing from the scope of the described method. For instance, one might choose to report a non-error after operation 808 before terminating at operation 812. Such variation might be practiced, for instance, when an error indication is always generated, with a certain value in the error indicator representing that no error has occurred.

Figure 4:
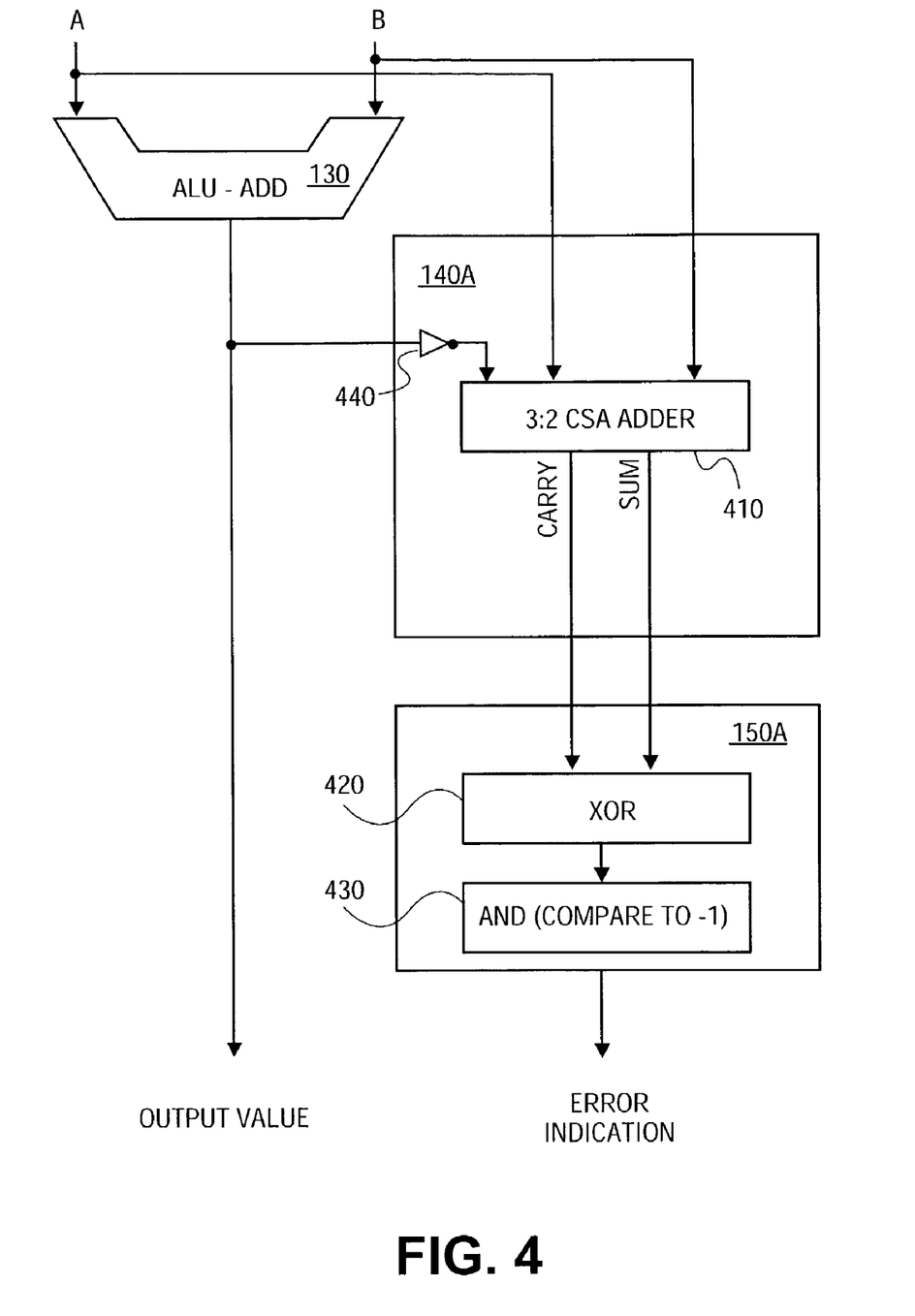
FIG. 4 is a block diagram illustrating at least one embodiment of a reduced-hardware software detection system for integer addition.

FIG. 4 is a block diagram illustrating embodiments of the compensate logic 140a and validate logic 150a for integer addition. The compensate logic 140*a* and validate logic 150*a* illustrated in FIG. 4 are based on the following observations pertaining to two's complement integer addition. (One skilled in the art will recognize that the compensate logic 140 and validate logic 150 also produce correct results for unsigned integer addition).

To generate the two's complement representation of an integer, the first step is to represent the integer in its binary form. If the represented integer is positive, no further steps are necessary—the binary form of a positive integer is the two's complement representation of that integer. For a negative integer, further action is necessary. In such case, each bit of the binary number is inverted in order to arrive at the one's complement representation of the number. A binary 1b"1" is then added to the one's complement representation in order to arrive at the two's complement representation of the negative number. Table 1 provides a simple three-bit example:

TABLE 1

| Start | Binary Start Value | 1's Comp of Start Value | Add (+1) to 1's Comp Value | Results (2's Comp.) |
|---|---|---|---|---|
| 4** | 100** | 011 | 100 | −4 |
| 3 | 011 | 100 | 101 | −3 |
| 2 | 010 | 101 | 110 | −2 |
| 1 | 001 | 110 | 111 | −1 |
| 0 | 000 | 111 | 000 (discard carry bit) | 0 |

**Note: Positive 4 cannot be represented in a three-bit two's complement representation. 1b'100' represents −4.

In order to negate a negative integer (thus producing a positive integer), the one's complement representation is derived by inverting each bit, and a binary "1" is then added to the result. Table 2 provides a simple three-bit example.

TABLE 2

| Start (2's Comp) | Binary Start Value | 1's Comp (Inversion) of Start Value | Add (+1) to 1's Comp Value | Result |
|---|---|---|---|---|
| 0 | 000 | 111 | 000 (discard carry) | 0 |
| −1 | 111 | 000 | 001 | 1 |
| −2 | 110 | 001 | 010 | 2 |
| −3 | 101 | 010 | 011 | 3 |
| −4 | 100 | 011 | 100** | 4** |

**Note: Positive 4 cannot be represented in a three-bit two's complement representation. 1b'100' represents −4.

Accordingly, the negated value for any two's complement integer (A) is the one's complement of A (referred to herein as ~A) plus 1b'1', providing the following equation:

$$-A = \sim A + 1 \qquad \text{Equ. 1}$$

Equ. 1 is true in each of the following cases: 1) negating a positive integer to generate a negative integer, 2) negating a negative integer to generate a positive integer, and 3) in the instance when A is zero (provided that the carry out bit beyond the size of the operand A is ignored). Equ. 1 can be further modified to solve for ~A:

$$\sim A = -A - 1 \qquad \text{Equ. 2}$$

Accordingly, Equ. 2 indicates that the one's complement of an integer A is represented by the negated two's complement representation of A minus a binary "1." If A and B are two signed integer inputs to an ALU, the output of the addition operation is represented by the A+B. If we invert each bit of the result, A+B, to derive ~(A+B), we are essentially forming the 1's complement of A+B and can use Equ. 2, to derive that ~(A+B)=−(A+B)−1. We can further simplify to derive that:

$$\sim(A+B) = -A - B - 1 \qquad \text{Equ. 3}$$

Equ. 3 is useful in deriving at least one embodiment of the compensation logic 140*a* for integer addition as illustrated in FIG. 4. An inverter 440 inverts the result output (i.e., A+B) from ALU 130 in order provide the inverted result (i.e., ~(A+B)) as an input into a carry-save adder 410. Accordingly, inverter 440 converts a first representation of the sum of A+B into a second representation of the sum, the second representation being ~(A+B).

One skilled in the art will recognize that a carry-save adder requires less hardware and less execution time than a carry-propagate adder, rendering it more desirable for soft error detection than a redundant carry-propagate adder such as the CPA (not shown) associated with ALU 130. A carry save adder 410 typically takes three inputs and provides two outputs: a sum value and a carry value.

In addition to the ~(A+B) value provided by the inverter 440, the CSA adder 410 is configured to receive A and B (the inputs to the ALU 130) as inputs. This configuration of inputs is based upon the following observations.

If CSA 410 adds A and B and the ~(A+B) value provided by the inverter 440, it will calculate: (A)+(B)+(−A−B−1)=x. Canceling complementary terms results in: (A)+ (B)+(−A−B−1)=x; x=−1. Accordingly, no matter the values of A and B, the outputs from a CSA that adds A, B and ~(A+B) should reflect carry and sum values representing −1. Accordingly, compensate logic 140*a* is implemented, for at least one embodiment, as a carry-save adder 410 that receives as inputs A, B, and ~(A+B), where A and B are inputs into the ALU 130, and ~(A+B) is the inverted output value from the ALU 130. In every case, the results in the carry and sum outputs of CSA 410 are expected to represent −1.

Figure 5:
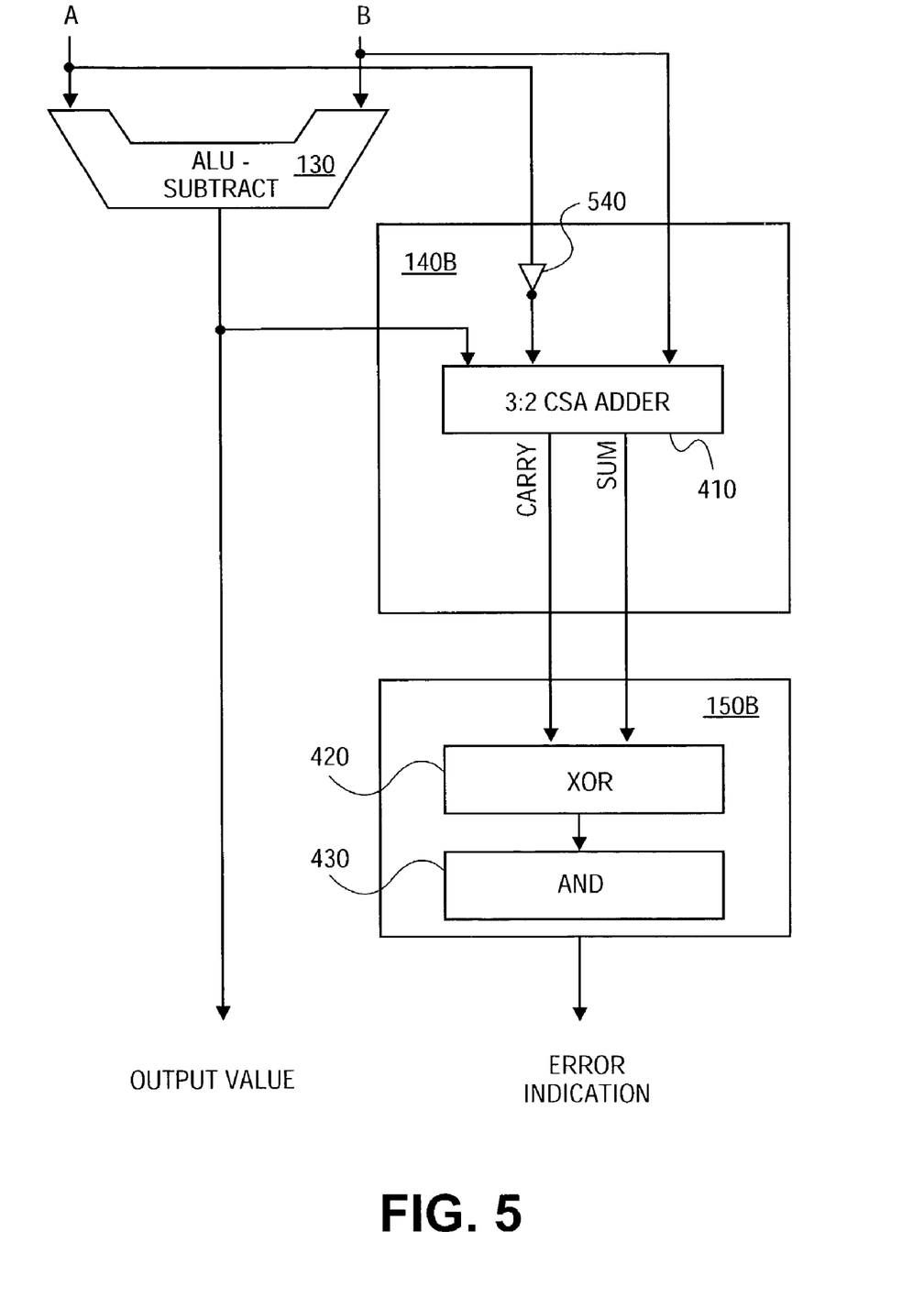
FIG. 5 is a block diagram illustrating at least one embodiment of a reduced-hardware software detection system for integer subtraction.

FIG. 5 is a block diagram illustrating embodiments of the compensate logic 140*b* and validate logic 150*b* for integer subtraction. The compensate logic 140 and validate logic 150 illustrated in FIG. 5 are based on the following observations pertaining to two's complement signed integer subtraction. (One skilled in the art will recognize that the compensate logic 140 and validate logic 150 operate correctly for unsigned integer subtraction as well.)

If A and B are the two inputs to ALU 130, the output of the ALU 130 based on the subtraction operation is represented by A−B. Furthermore, using Equ. 2 we can derive that the inverted value of A=−A−1. By inverting the value of A, a second representation of A (that is, ~A) can be provided to CSA 410.

FIG. 5 illustrates that the inverted value of A (as provided by inverter 540), along with B and the result (i.e., A−B) of the ALU 130 are each provided as inputs to CSA 410. Adding ~A, B, and the output of the subtraction operation (i.e., A−B), we get: (−A−1)+B+(A−B)=x. Canceling complementary terms yields: (−A−1)+B+(A−B)=x; x=−1. Accordingly, compensate logic 140*b* is implemented, for at least one embodiment, as a carry-save adder 410 that receives as inputs ~A, B, and (A−B), where A and B are inputs into the ALU 130, ~A is the inverted value of A, and (A−B) is the output value from the ALU 130. For all values of A and B, the results in the carry and sum outputs of CSA 410 are expected to represent −1.

FIG. 4 further illustrates the validate logic 150a for integer addition while FIG. 5 further illustrates the validate logic 150b for integer subtraction. FIGS. 4 and 5 illustrate that the validate logic (which is, for at least one embodiment, the same for both addition and subtraction because both have an expected input value of −1) includes relatively inexpensive XOR and AND logic elements 420 and 430, respectively. These elements 420, 430 are configured to operate on the carry and sum outputs of CSA 410 in order to determine whether the output of the CSA represents a value of −1. These elements 420, 430 are discussed in further detail below in connection with FIG. 7.

Figure 6:
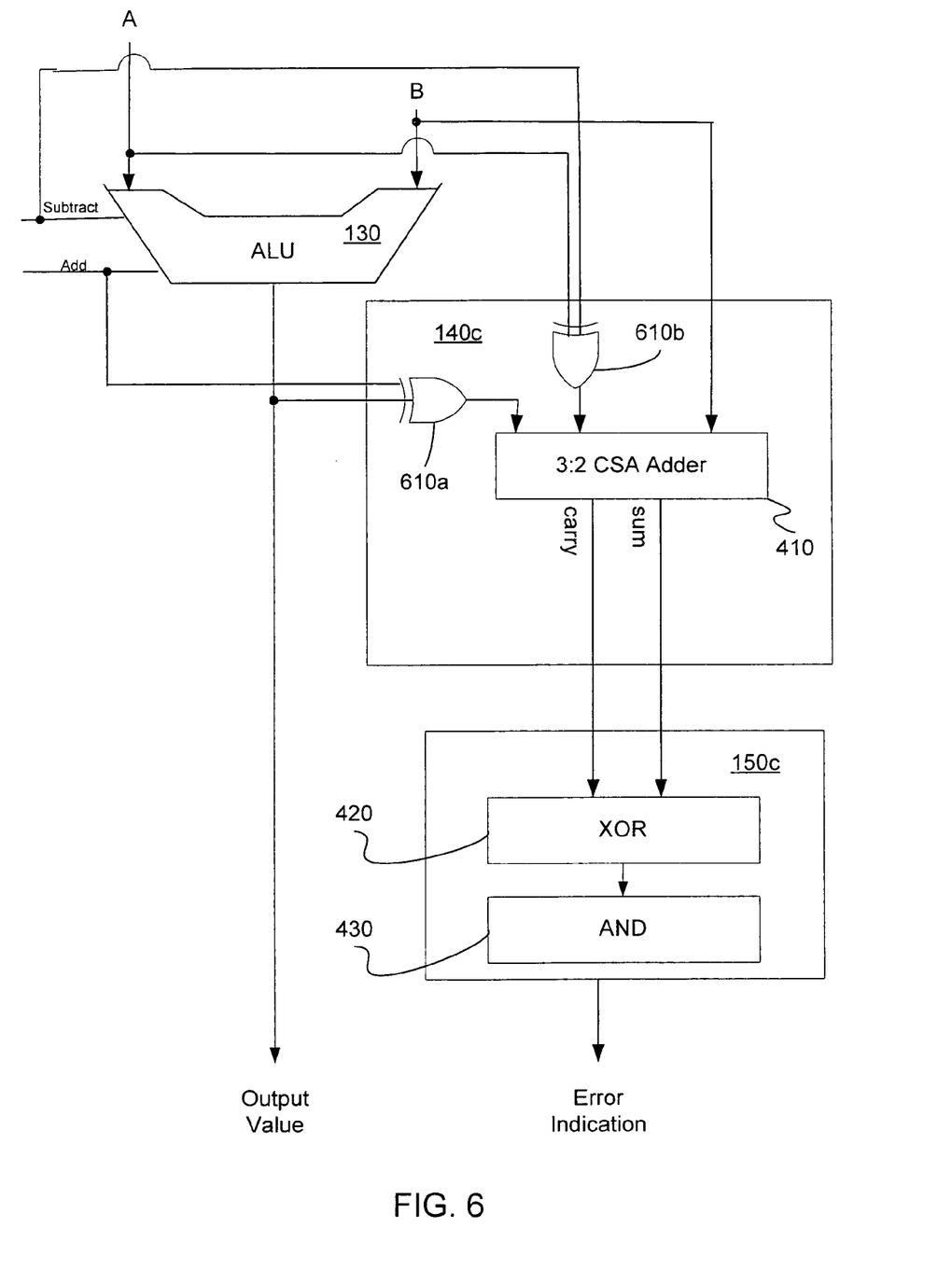
FIG. 6 is a block diagram illustrating at least one embodiment of a reduced-hardware software detection system for both integer addition and subtraction for integer arithmetic.

FIG. 6 is a block diagram illustrating an apparatus that is configured to perform reduced-hardware soft error detection for both addition and subtraction for integers. From an analysis of FIG. 4, which represents soft error detection for integer addition, and FIG. 5, which represents soft error detection for integer subtraction, the following observations may be made. For addition, the output of the ALU 130 is inverted and the inverted value is provided as in input into CSA 410. In contrast, for subtraction, the ALU output is provided to CSA 410 without inversion. However, the A input to the ALU 130 for a subtraction operation is inverted before it is provided as an input to CSA 410. Accordingly, a conditional inversion operation is required. That is, input A must be inverted when the desired operation is subtraction, whereas the output from the ALU 130 (that is, A+B) must be inverted when the desired operation is addition.

FIG. 6 illustrates at least one embodiment of implementing a conditional inversion. The conditional inversion is accomplished via means of two bit-wise XOR gates 610a, 610b. A control signal, indicating that an addition operation has been requested to generate the current ALU output value, is provided to a first XOR gate 610a. Assuming that the add control signal holds a logic-high value to indicate that an addition operation has been requested, a conditional inversion will occur according to the following truth table:

TABLE 3

| "ADD" signal from ALU | A + B | XOR Result (to CSA) |
| --- | --- | --- |
| 0 | 0 | 0 |
| 0 | 1 | 1 |
| 1 | 0 | 1 |
| 1 | 1 | 0 |

The shaded cells of Table 3, above, indicate that an inversion of the original value of A+B occurs when the ADD signal holds a logic-high value.

FIG. 6 further illustrates that a second XOR gate 610b performs a similar conditional inversion for the subtraction operation. A control signal, indicating that a subtraction operation has been requested to generate the current ALU output value, is provided to a second XOR gate 610b. Assuming that the subtract control signal holds a logic-high value to indicate that a subtraction operation has been requested, a conditional inversion of the A input to the ALU 130 will occur according to the following truth table:

TABLE 4

| "SUB" | A | XOR |
| --- | --- | --- |
| 0 | 0 | 0 |
| 0 | 1 | 1 |
| 1 | 0 | 1 |
| 1 | 1 | 0 |

The shaded cells of Table 4, above, indicate that an inversion of the original value of A occurs when the SUB signal holds a logic-high value.

Of course, one skilled in the art will recognize that alternative logic can be employed to serve the same function as the conditional inversion discussed above. For instance, in some cases the ADD/SUB control signal is a single input to the ALU, rather than two separate control lines. One skilled in the art will recognize that a simple inverter may be used to implement the conditional inversion logic described above using two XOR gates 610a, 610b with a single control signal. Also, one skilled in the art will recognize that pass gates may be used instead of XOR gates 610a, 610b to achieve the same results.

FIGS. 4, 5 and 6 each disclose an embodiment of soft error detection that produces, as a result of compensate logic 140a, 140b and 140c, respectively, a value of −1 if no soft error is detected. Each of the associated validate logics 150a, 150b and 150c, respectively, detects whether or not the compensate value is −1. Each validate logic 150a, 150b and 150c checks for a value of −1 in the same manner, as described immediately below.

In the embodiments disclosed in FIGS. 4, 5 and 6, validate logic 150a, 150b, 150c, respectively, do not include a carry-propagate adder in order to determine if the carry and sum outputs from CSA adder 410 equate to a value of −1. While a CSA is a full adder, which takes relatively little hardware to implement, a carry-propagate adder is a more complex hardware element, replication of which the disclosed embodiments aim to avoid. To avoid using a CPA in validate logic 150a, 150b and 150c, the following observation is exploited:

If X, Y and Z are integers that are inputs to a carry-save adder, and S and C are the sum and carry outputs of the carry-save adder, and if S+C=−1, then (S XOR C)=−1.

That is, S XOR C equals the two's complement representation of −1 when S+C=−1. One skilled in the art will recognize that the two's complement representation of −1 contains a binary value of 1b'1' in each bit position (see, e.g., Tables 1 and 2).

Figure 7:
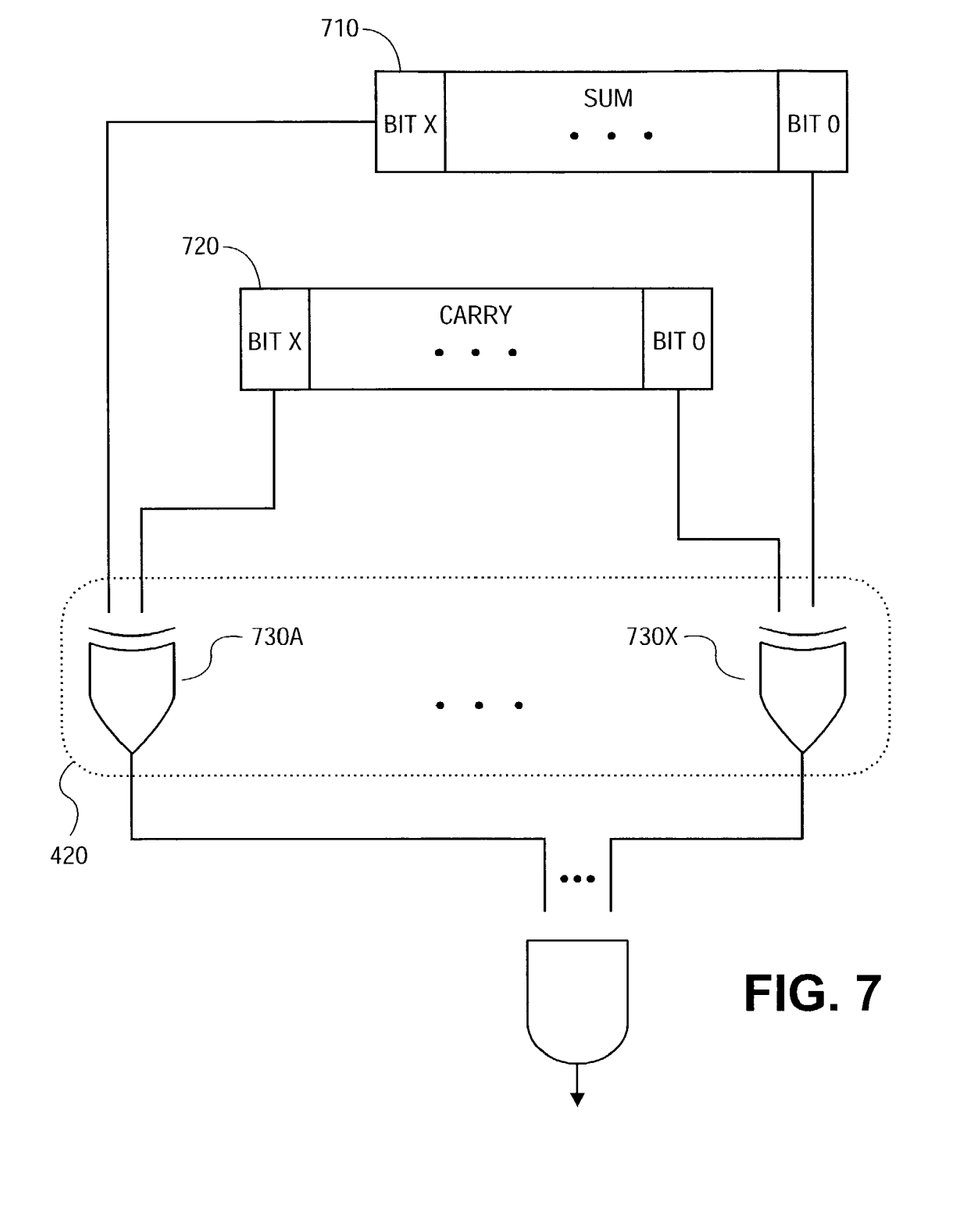
FIG. 7 is a block diagram illustrating at least one embodiment of the validate logic illustrated in FIGS. 1, 3A and 4–6.

FIG. 7 illustrates the validate logic 150a, 150b, 150c in further detail. The validate logic performs a consolidation operation on the sum and carry outputs of the CSA adder 410 and determines whether the resulting value (referred to herein as a validation result value) is equal to the predetermined validation value of −1. FIG. 7 illustrates that the consolidation operation is accomplished by XOR'ing each bit of the carry output 720 from CSA 410 with the corresponding bit of the sum output 710 from the CSA 410. FIG. 7 illustrates that, in order to determine whether the validation result value produced by the XOR logic 420 includes a 1b'1' in each bit position, the outputs from XOR gates 730a through 730x are provided to an AND gate 430. If the output from AND gate 430 is true, then S XOR C=−1, and no soft error has been detected.

If the output from AND gate 430 is not true, then one of several error conditions may have occurred. A soft error may have occurred in the ALU 130, the compensate logic 140 or the validate logic 150. Alternatively, a hardware design error in the ALU hardware 130 may have been detected. Processing of the output from the AND gate 430 in order to report and/or correct error conditions may be implemented in any feasible manner. For at least one embodiment, the error indication generated as the output of the AND gate 430 is provided to the retirement logic 120 (FIG. 1).

Though not specifically depicted in FIGS. 1 through 7, latches may be used to latch desired values in the disclosed embodiments. For example, latches may used to latch the A and B values provided as inputs to the ALU 130 and the compensate logic 140. In addition, the output from the ALU 130 may be latched, as may the output from XOR gates 610a, 610b discussed above in connection with FIG. 6.

One skilled in the art will recognize that numerous variations can be made in the soft error detection embodiments described above without departing from the spirit and scope of the following claims.

Figure 8:
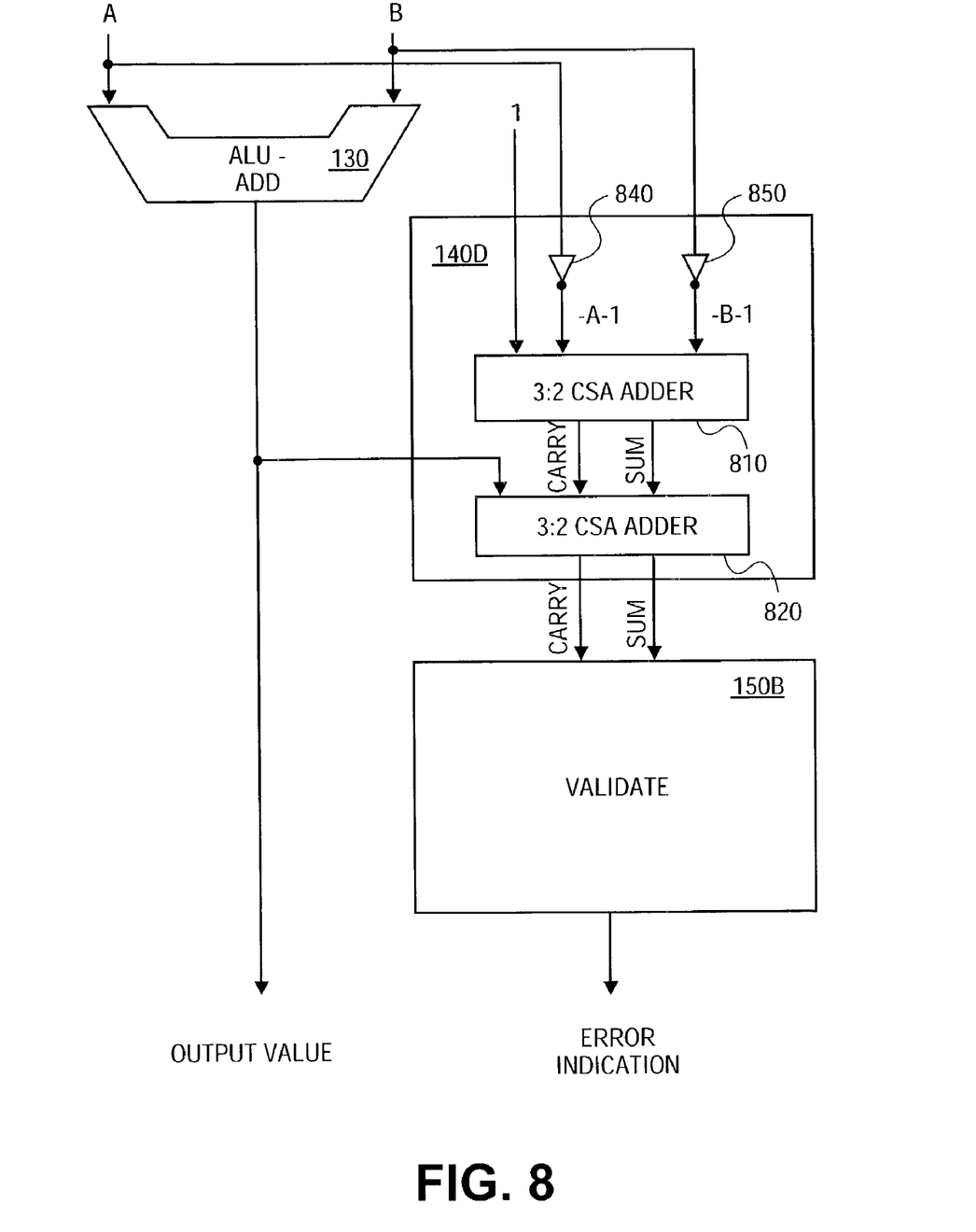
FIG. 8 is a block diagram illustrating at least one alternative embodiment for compensation logic for integer addition.

For instance, FIG. 8 illustrates that an additional hardware element 820 may be implemented in computation logic 140d in order to reduce delay. That is, FIG. 8 illustrates that A and B are inputs to ALU 130. The output of ALU 130 is A+B, which is an input to a second carry-save adder 820. As inputs to a first carry-save adder, ~A is derived via inverter 840 and ~B is derived via inverter 850. Both ~A and ~B are provided as inputs to first CSA 810. As a third input to first CSA 810, the constant value 1, represented in two's complement format, is provided.

First CSA 810 adds ~A, ~B and 1. The negated value of A, following Equ. 2 from above, is −A−1 while the negated value of B, following Equ. 2 from above, is −B−1. First CSA 810, in adding ~A, ~B and 1, computes the sum and carry values for: −A−1−B−1+1=−A−1−B. The computation of the first CSA 810 can be accomplished at the same time that the ALU 130 is computing A+B, in order to avoid excess delay.

The sum and carry values generated by first CSA 810 are provided to the second CSA 820, along with the output (A+B) from ALU 130. The second CSA 820 computes −A−1−B+A+B, yielding −1. Accordingly, for all inputs A and B, the result of the compute logic 140d is expected to yield the predetermined validation value of −1.

Figure 9:
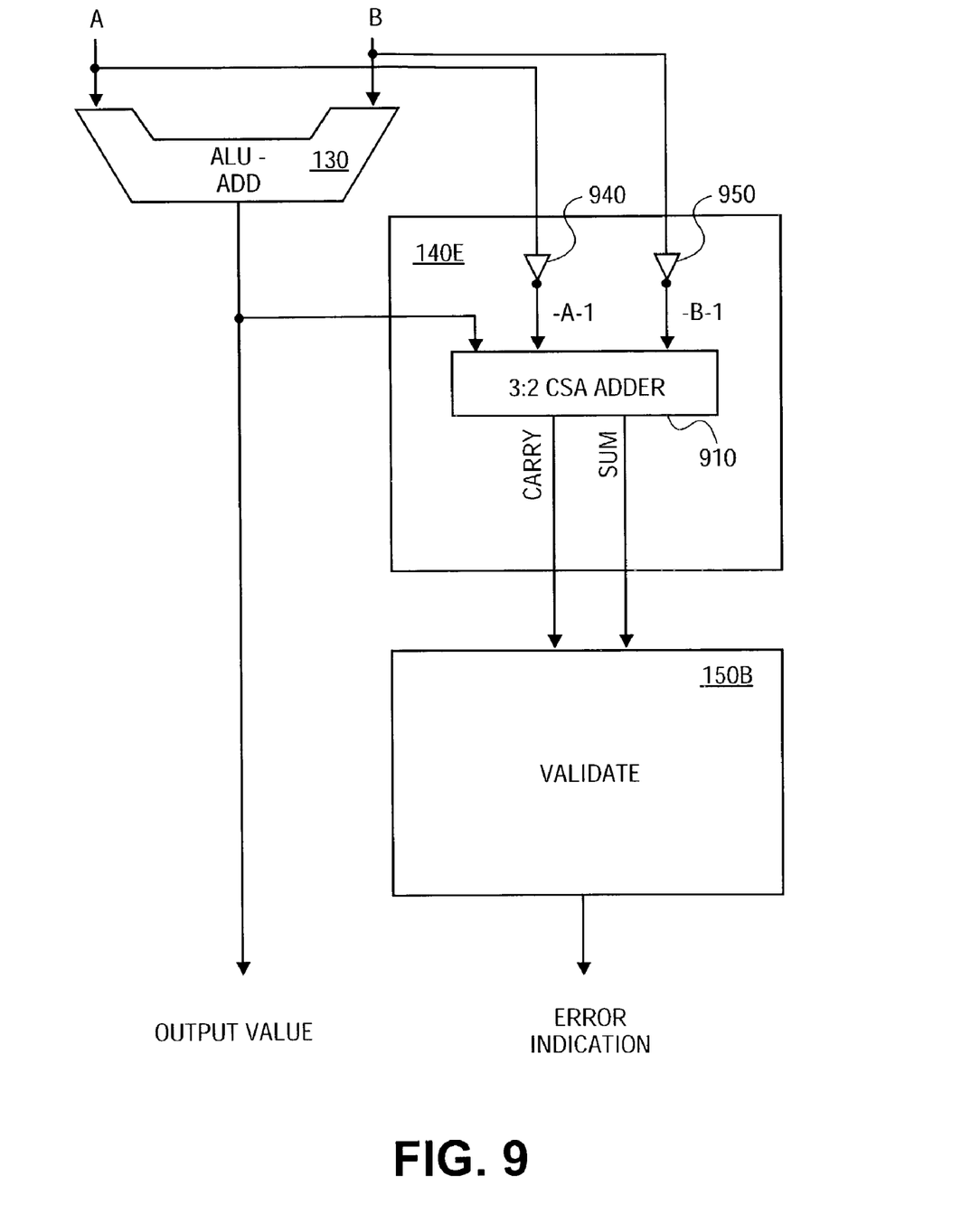
FIG. 9 is a block diagram illustrating at least one other alternative embodiment for compensation logic for integer addition.

FIG. 9 represents yet another alternative embodiment for the compensate logic 140e for integer addition. In the embodiment of compensate logic 140e represented in FIG. 9, inverted values of A and B are provided to CSA 910. Accordingly, −A−1 and −B−1 are provided to CSA 910. In addition, the result from the ALU's integer addition operation is also provided as an input to CSA 910. That is, ALU 130 provides A+B as an input to CSA 910. Accordingly, CSA 910 computes −A−1−B−1+A+B, which yields, when complementary terms are canceled, −2. This embodiment requires that the validation logic determine, through any reliable method, whether the expected predetermined validation value of −2 has been generated by compensation logic 140e.

There has thus been provided a system and method for detecting soft errors in combinational logic without redundant arithmetic hardware, such as a carry-propagate adder in an ALU. Specific embodiments of non-redundant soft error detection for integer addition and subtraction have been provided. In each case, compensate logic and validate logic are provided rather than a redundant ALU and compare logic. In one of the disclosed embodiments, soft error detection for integer addition is performed without a redundant carry-propagate adder. In another of the disclosed embodiments, soft error detection for integer subtraction is performed, also without a redundant carry-propagate adder. In yet another of the disclosed embodiments, soft error detection is performed for both integer addition and subtraction, XOR gates being used to perform conditional inversions for A and for the output of the ALU. In each of the embodiments for soft error detection systems, an ALU is provided along with a compensate logic and a validate logic. For integer addition, at least one embodiment of the compensate and validate logic determine whether the sum of A, and B, and ~(A+B) (where A+B is computed by ALU 130), equals −1. For integer subtraction, at least one embodiment of the compensate and validate logic determine whether the inverted value of A, summed with B and (A−B), equal −1.

While particular embodiments of the present invention have been shown and described, it will be obvious to those skilled in the art that changes and modifications can be made without departing from the present invention in its broader aspects. The appended claims are to encompass within their scope all such changes and modifications that fall within the true scope of the present invention.

What is claimed is:

1. A method comprising:
   performing an arithmetic operation using a first integer operand and a second integer operand to produce an integer result;
   performing non-redundant compensation based on the first integer operand, the second integer operand and the integer result to produce a compensation result that includes a sum value and a carry value; and
   validating the compensation result to determine whether an error condition exists.

2. The method of claim 1, wherein:
   validating the compensation result to determine whether an error condition exists includes determining whether the compensation result is equivalent to a predetermined validation value.

3. The method of claim 2, wherein the predetermined validation value is −1.

4. The method of claim 1, wherein validating the compensation result to determine whether an error condition exists further comprises:
   performing a consolidation operation on the sum value and the carry value to yield a validation result value; and
   determining whether the validation result value is equal to a predetermined validation value.

5. The method of claim 4, wherein the predetermined validation value is −1.

6. The method of claim 1, wherein:
   the arithmetic operation is addition.

7. The method of claim 6, wherein performing non-redundant compensation further includes:
   inverting the integer result to generate an inverted integer result; and
   summing the inverted integer result, the first integer operand and the second integer operand to generate the compensation result.

8. The method of claim 1, wherein the arithmetic operation is subtraction.

9. The method of claim 8, wherein performing non-redundant compensation further includes:

inverting the first integer operand to produce an inverted operand; and summing the inverted operand, the second integer operand, and the integer result to generate the compensation result.

10. The method of claim 1, wherein performing non-redundant compensation further includes:

conditionally inverting, if a subtraction operation is indicated, the first integer operand in order to produce an inverted subtraction operand;

conditionally inverting, if an addition operation is indicated, the integer result in order to produce an inverted addition result, the integer result being the sum of the first integer operand and the second integer operand;

summing, if an addition operation is indicated, the inverted addition result, the first integer operand and the second integer operand; and summing, if a subtraction operation is indicated, the inverted subtraction operand, the second integer operand, and the integer result in order to generate the compensation result, the subtraction result being the difference of the first integer operand and the second integer operand.

11. A processor comprising:

an arithmetic logic unit to generate an output value;

a compensate logic to generate a compensation result based on the output value, wherein the compensation result includes a sum value and a carry value; and a validate logic to determine whether the compensation result is equivalent to a predetermined validation value.

12. The processor of claim 11, wherein the validate logic further includes:

logic to perform a consolidation operation on the sum value and the carry value to yield a validation result value; and logic to determine whether the validation result is equal to a predetermined validation value.

13. The processor of claim 12, wherein the predetermined validation value is −1.

14. The processor of claim 11, wherein the compensate logic includes:

logic to invert a first integer operand in order to produce an inverted operand; and logic to sum the inverted operand, a second integer operand, and the output value to generate the compensation result, the output value representing a subtraction result.

15. The processor of claim 11, wherein the compensate logic includes:

logic to invert the output value to produce an inverted addition result, the output value representing the sum of a first integer operand and a second integer operand; and logic to sum the first integer operand, the second integer operand, and the inverted addition result in order to generate the compensation result.

16. The processor of claim 11, wherein the predetermined validation value is −1.

17. The processor of claim 11, wherein the compensate logic includes:

logic to conditionally invert, if a subtraction operation is indicated, a first integer operand in order to produce an inverted subtraction operand;

logic to conditionally invert, if an addition operation is indicated, the output value in order to produce an inverted addition result, the output value representing the sum of the first integer operand and a second integer operand;

logic to sum, if an addition operation is indicated, the inverted addition result, the first integer operand and the second integer operand; and logic to sum, if a subtraction operation is indicated, the inverted subtraction operand, the second integer operand, and the output value in order to generate the compensation result, the output value representing the difference of the first integer operand and the second integer operand.

18. An apparatus comprising:

an arithmetic logic, the arithmetic logic unit to receive a first integer operand and a second integer operand and to generate an integer result;

means for generating a compensation result based on the integer result, wherein the compensation result includes a sum value and a carry value; and means for determining whether the compensation result is equivalent to a predetermined validation value.

19. The apparatus of claim 18, wherein the predetermined validation value is −1.

20. The apparatus of claim 18, wherein the validation logic includes:

means for providing a validation result value based on the sum value and the carry value; and means for determining whether the validation result is equal to a predetermined validation value.

21. The apparatus of claim 20, wherein the predetermined validation value is −1.

22. The apparatus of claim 18, wherein means for generating a compensation result further includes:

means for summing the first integer operand and the second integer operand with the one's complement of the integer result in order to generate the compensation result, the integer result representing the sum of the first operand and the second operand.

23. The apparatus of claim 18, wherein means for generating a compensation result further includes:

means for summing the integer result with the second integer operand and the one's complement of the first integer operand to generate the compensation result, the integer result representing the difference of the first and second integer operands.

24. The apparatus of claim 18, wherein means for generating a compensation result further includes:

means for conditionally inverting, if a subtraction operation is indicated, the first integer operand in order to produce an inverted subtraction operand;

means for conditionally inverting, if an addition operation is indicated, the integer result in order to produce an inverted addition result, the integer result being the sum of the first integer operand and the second integer operand;

means for summing, if an addition operation is indicated, the inverted addition result, the first integer operand and the second integer operand; and means for summing, if a subtraction operation is indicated, the inverted subtraction operand, the second integer operand, and the integer result in order to generate the compensation result, the integer result being the difference of the first integer operand and the second integer operand.

25. A method comprising:

performing an addition operation on a first integer operand and a second integer operand to produce a first representation of an integer result;

converting the first representation of the integer result to a second representation of the integer result;

performing non-redundant compensation based on the first integer operand, the second integer operand and the second representation of the integer result to produce a compensation result; and validating the compensation result to determine whether an error condition exists.

26. The method of claim 25, wherein:

validating the compensation result to determine whether an error condition exists includes determining whether the compensation result is equivalent to a predetermined validation value.

27. The method of claim 26, wherein the predetermined validation value is −1.

28. The method of claim 25, wherein:

the compensation result includes a sum value and a carry value.

29. A method comprising:

performing a subtraction operation on a first integer operand and a first representation of a second integer operand to produce an integer result;

converting the first representation of the second integer operand to a second representation of the second integer operand;

performing non-redundant compensation based on the first integer operand, the second representation of the integer operand and the integer result to produce a compensation result; and validating the compensation result to determine whether an error condition exists.

30. The method of claim 29, wherein:

validating the compensation result to determine whether an error condition exists includes determining whether the compensation result is equivalent to a predetermined validation value.

31. The method of claim 30, wherein the predetermined validation value is −1.

32. The method of claim 29, wherein:

the compensation result includes a sum value and a carry value.

* * * * *